J. B. ENTZ.
DYNAMO ELECTRIC MACHINE.
APPLICATION FILED JULY 5, 1913.

1,162,991.

Patented Dec. 7, 1915.
2 SHEETS—SHEET 1.

Witnesses
E. B. Gilchrist
L. I. Porter

Inventor
Justus B. Entz
by Thurston & Kwis
Attys.

J. B. ENTZ.
DYNAMO ELECTRIC MACHINE.
APPLICATION FILED JULY 5, 1913.
1,162,991.
Patented Dec. 7, 1915.
2 SHEETS—SHEET 2.
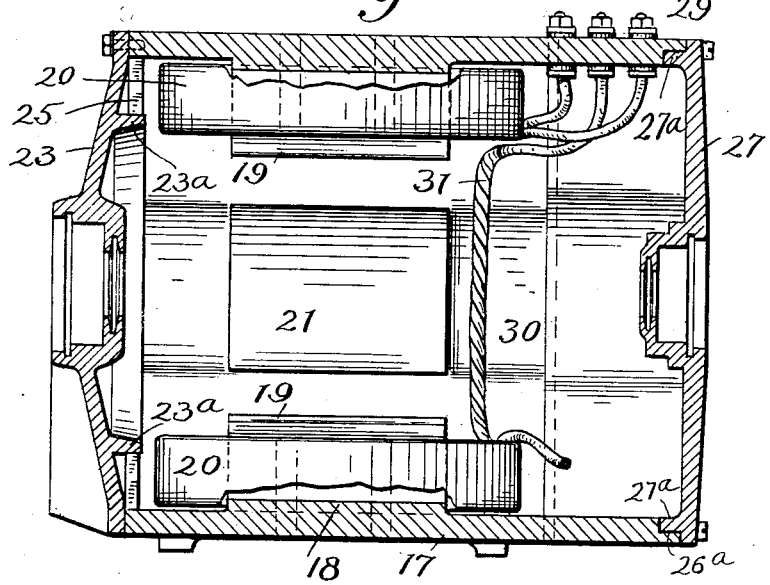
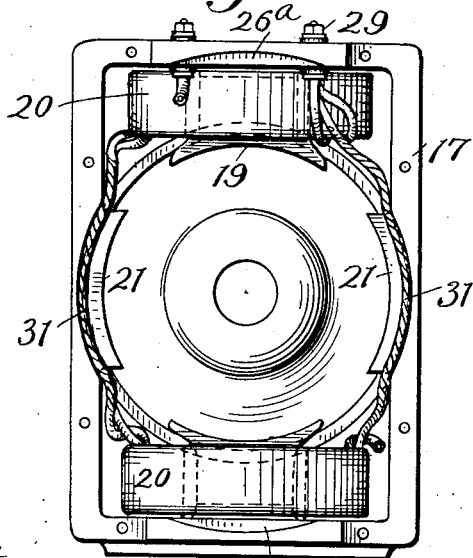
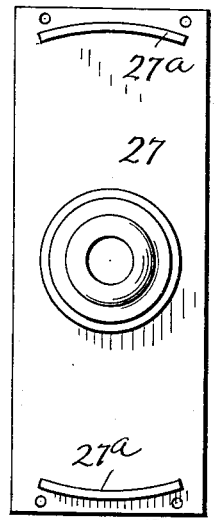

UNITED STATES PATENT OFFICE.

JUSTUS B. ENTZ, OF CLEVELAND, OHIO.

DYNAMO-ELECTRIC MACHINE.

1,162,991.   Specification of Letters Patent.   Patented Dec. 7, 1915.

Application filed July 5, 1913. Serial No. 777,419.

*To all whom it may concern:*

Be it known that I, JUSTUS B. ENTZ, a citizen of the United States, residing at Cleveland, in the county of Cuyahoga and State of Ohio, have invented a certain new and useful Improvement in Dynamo-Electric Machines, of which the following is a full, clear, and exact description.

This invention relates to electric starting and lighting apparatus for motor vehicles, and has for its principal object the provision of a dynamo electric machine which is efficient as a motor and as a generator and is admirably adapted for the small space which can be devoted to a machine of this character in a motor vehicle. Further, the invention aims to provide a machine which while made as compact as possible, particularly in a lateral direction, nevertheless has high torque when serving as a motor for starting purposes, and has the requisite current output when serving as a generator for lighting and battery charging purposes.

Figure 1:
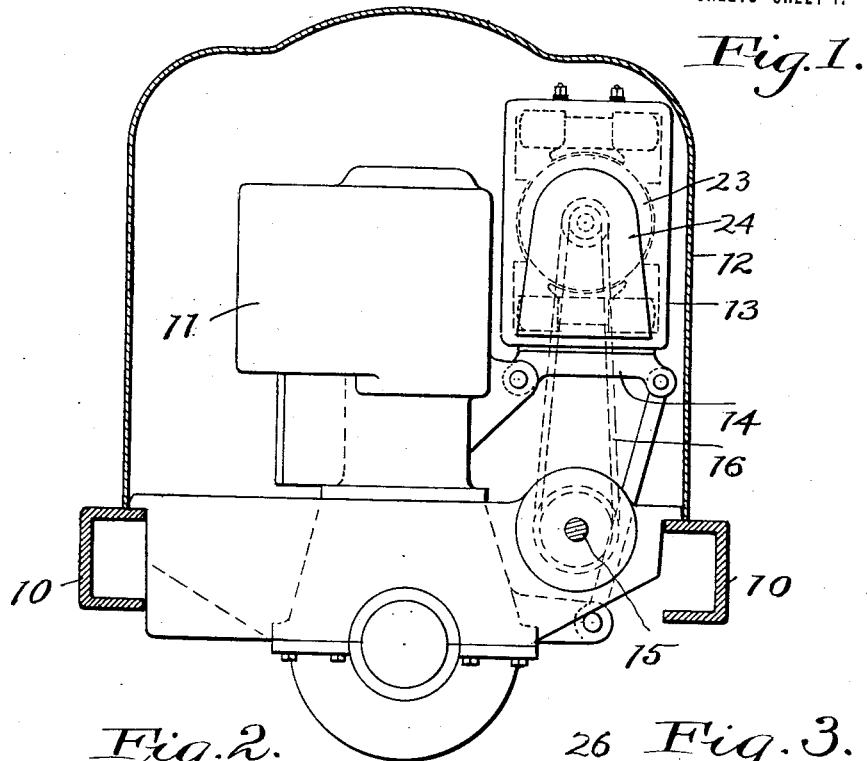
Figure 2:
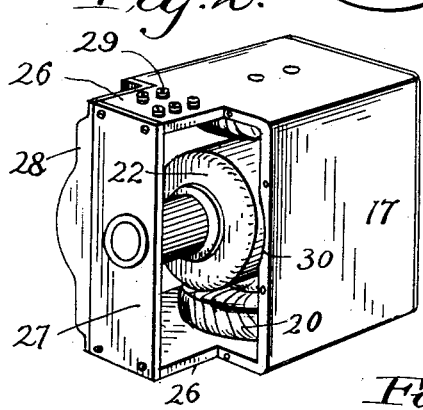
Figure 3:
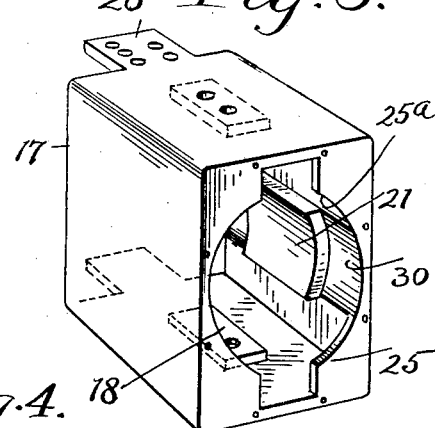
Figure 4:
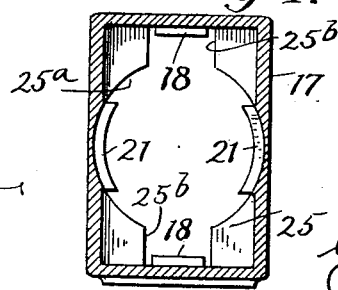

In the accompanying sheets of drawings, Figure 1 is a sectional view through the frame and hood of a motor vehicle, and illustrates one location of the dynamo electric machine which is admirably situated for the purpose of starting the engine, and for lighting purposes; Fig. 2 is a perspective view of the dynamo motor with one of the commutator cover plates removed; Fig. 3 is a perspective view of the field frame or housing; Fig. 4 is a transverse sectional view of the same; Fig. 5 is a longitudinal sectional view of the same with the end covers and field windings in place; Fig. 6 is an end view of the same looking toward the commutator end of the field member, with the end cover removed; and Fig. 7 is an inner side view of the end cover which is removed from Fig. 6.

In the drawings, 10 represents the side members of the chassis of the motor vehicle; 11 the internal combustion engine, and 12 the hood which incloses the engine. The dynamo electric machine 13 is in this case arranged within the hood alongside of the engine and is mounted upon a shelf 14 which is above an auxiliary shaft 15, which may be the magneto shaft and will be geared in the usual manner to the crank shaft of the engine, but such connecting gearing is not here shown.

This dynamo electric machine, as will be understood, is to serve as a motor to turn over or start the engine, and after the engine is started, is adapted to be driven as a generator for battery charging or lighting purposes. One train of gearing only is used for transmission of power between the engine and dynamo electric machine, and in this case, the shaft of the dynamo electric machine is connected to the auxiliary shaft 15, by chain and sprocket gearing shown conventionally at 16 in Fig. 1.

It will be seen that with the dynamo electric machine located as in the present case, and in fact, it is true even if placed in some other locality, the machine must in view of the fact that there is little space which can be devoted to the same wherever it may be located, be as compact as possible, consistent with the degree of efficiency, current output, and torque required. With the machine mounted as here shown, there is of necessity little space for it between the engine and the side of the hood, and in consequence, the machine is made considerably smaller in width than in height.

By reference to the drawings, it will be seen that the dynamo electric machine includes a rectangular shaped field housing 17, which is nearly twice as high as it is wide. This field member or housing 17 which is of the four pole type, has on its top and bottom walls inwardly extending pole projections 18 to which are secured pole pieces 19, provided with field coils 20. In practice, I provide both shunt and series windings on the poles 19 but in this instance, the two windings are taped together, and I do not regard it necessary for the purpose of this application to show the individual parts of the windings.

The side walls of the housing are provided with very short integral inwardly projecting poles 21. The latter have no field coils, and in fact are not sufficiently long for that purpose. It will be observed that the lateral inwardly projecting poles 21 are at their inner ends curved concentrically with respect to the axis of the machine, the length of these poles and the radius of curvature being such that at the middle of the pole, the extended inner faces of the side walls are practically tangent with the curved ends of the poles. The machine includes also an armature 22, which compared with the width of the machine, is of considerable diameter, the diameter of the armature being only slightly less than the interior width of the housing. In fact, the difference between the inside width of the housing and the diameter of the armature is equal only to twice the clearance space between the armature and any one of the pole pieces. This relatively large armature diameter is an important factor in securing the high torque which this machine possesses.

The forward end of the machine is closed by an end plate 23 in which one end of the armature shaft is journaled. This end plate is provided on its outer side with a hood or guard 24 which incloses the upper sprocket wheel and a portion of the sprocket chain. In addition to this cover plate 23, the forward end of the housing is provided with an integral end web 25 having a circular opening 25ª which receives with a close fit, a circular flange 23ª on the inner side of the end cover plate 23. The cover plate is secured in position by screws and is held from displacement by these screws and by the web 25 having the circular opening into which is fitted the circular flange of the end plate, said web being of particular importance in preventing downward displacement of the shaft and armature, due to the pull of the chain which transmits power to and from the armature shaft.

It will be observed that this web is provided adjacent the top and bottom walls with notched out portions 25ᵇ which are provided to facilitate planing of the inner ends of the pole stubs or projections 18 to which the pole shoes 19 are secured.

At the opposite or rear end of the machine, which is the commutator end, the top and bottom walls of the housing are extended outwardly in the form of a pair of projecting arms 26 to which is secured by fastening screws, a plate or bracket 27, considerably narrower than the width of the machine. The armature shaft is journaled in the forward end plate 23, and in the rear plate or bracket 27. As shown particularly in Fig. 2, the commutator end of the housing is provided at the corners with two commutator covers 28 which are removably secured to the housing and constitute closures for the housing, between the end plate or bracket 27, and the adjacent sides of the housing.

The terminals of the different armature and field connections are all brought out through the upper housing extension 26, the terminals being shown conventionally at 29. In view of the extreme compactness of the machine, the extension forms the most desirable and in fact the only available part through which the terminals can be brought.

In view of the fact that the diameter of the armature is nearly as great as the internal width of the machine, there would be insufficient space between the armature and side walls of the housing for the connecting conductors extending between the upper and lower sets of field coils, if the inner sides of the side walls of the housing were extended downwardly in straight lines. To provide space between the side walls and the armature for the conductors which extend betwen the field coils on the upper and lower poles 19, the inner faces of the housing, at one or both ends of the machine at the side of the short stub poles 21, are recessed or grooved outwardly opposite the armature in conformity with the curvature of the armature as shown at 30, and the connecting conductors shown at 31 are bent outwardly in said recesses, so as to clear the armature.

It will be observed by reference to Figs. 5, 6 and 7 that the end cover member 27 is secured to the ends of the extensions 26, and is centered thereon by means of inwardly projecting arc-shaped lugs or ribs 27ª which engage within arc-shaped grooves or slots 26ª in the ends of the extensions 26. All surfaces of the field housing which are rounded or cut concentrically with respect to the axis of the machine, said surfaces including the inner ends of the pole projections 21, the inner ends of the poles 19, circular opening 25ª in the web 25, the recessed portions 30 in the side of the housing, and the arc-shaped slots 26ª,—are all cut or turned with one centering of the housing. This reduces materially the cost of manufacture of the machine and insures accurate assemblage or alinement of the parts.

Having thus described my invention, what I claim is:

1. A dynamo electric machine comprising a rectangular shaped field magnet housing having integral top, bottom and side walls, and provided with inwardly projecting pole pieces extending from the top and bottom walls, an end plate closing one end of the housing, the top and bottom walls of the housing being extended opposite end of the housing being extended outwardly so as to form projecting arms of less width than said walls, an end plate secured to the ends of said arms, an armature journaled in said end cover and end plate, and commutator cover plates arranged at the corners of the housing on opposite sides of said end plate and arms.

2. A dynamo electric machine comprising a rectangular shaped field magnet housing having integral top, bottom and side walls, and provided with field pole pieces secured to the top and bottom walls and pole projections integral with the side walls thereof, an end cover for one end of the housing, the top and bottom walls at the opposite end of the housing being extended outwardly to form upper and lower projecting arms of less width than said walls, a plate extending between and secured to said arms, removable commutator covers secured to the ends of the housing on opposite sides of said arms, an armature journaled in said end cover and plate, and field and armature terminals extending through one of said arms.

3. A dynamo electric machine comprising a rectangular shaped field magnet housing of greater height than width, said housing having at one end on the top and bottom walls a pair of centrally disposed outwardly projecting arms and having at the opposite end an integral web partially closing said end and provided with a centrally disposed opening, an end cover plate for the last named end of the housing, provided with a flange fitting said opening, a vertical member extending between and secured to said arms, an armature rotatably supported by said cover plate and said vertical member, and cover plates secured to the corners of the housing on opposite sides of said arms.

4. A dynamo electric machine comprising a field magnet housing having integral top, bottom and side walls and provided with inwardly projecting pole pieces, an end plate closing one end of the housing, two of the walls at the opposite end of the housing being extended outwardly so as to form projecting arms of less width than said walls, an end plate secured to the ends of said arms, an armature journaled in said end cover and end plate, and commutator cover plates arranged at the corners of the housing on opposite sides of said end plate and arms.

5. A dynamo electric machine comprising a field magnet housing having integral top, bottom and side walls and provided with inwardly projecting pole pieces, an end plate closing one end of the housing, two of the walls at the opposite end of the housing being extended outwardly so as to form projecting arms of less width than said walls, an end plate secured to the ends of said arms, an armature journaled in said end cover and end plate, commutator cover plates arranged at the corners of the housing on opposite sides of said end plate and arms, and field and armature terminals extending through one of said arms.

6. A dynamo electric machine comprising a rectangular shaped field magnet housing having at one end on two of the walls of the housing a pair of centrally disposed outwardly projecting arms, and having at the opposite end an integral web partially closing said end and provided with a centrally disposed opening, an end cover plate for the last named end of the housing, provided with a flange fitting said opening, a member extending between and secured to said arms, an armature rotatably supported by said cover plate and said member, and cover plates secured to the corners of the housing on opposite sides of said arms.

In testimony whereof, I hereunto affix my signature in the presence of two witnesses.

JUSTUS B. ENTZ.

Witnesses:
L. I. PORTER,
A. F. KWIS.